(12) United States Patent
Eliassen et al.

(10) Patent No.: US 11,318,831 B2
(45) Date of Patent: May 3, 2022

(54) SENSOR HEAD WITH RETURN LINE

(71) Applicant: TE Connectivity Norge AS, Blomsterdalen (NO)

(72) Inventors: Bengt Eliassen, Radal (NO); Girish Chebbi, Radal (NO)

(73) Assignee: TE CONNECTIVITY NORGE AS, Blomsterdalen (NO)

( * ) Notice: Subject to any disclaimer, the term of this patent is extended or adjusted under 35 U.S.C. 154(b) by 0 days.

(21) Appl. No.: 16/931,037

(22) Filed: Jul. 16, 2020

(65) Prior Publication Data
US 2021/0031618 A1 Feb. 4, 2021

(30) Foreign Application Priority Data
Aug. 1, 2019 (EP) .................................. 19189623

(51) Int. Cl.
*B60K 13/04* (2006.01)
*F01N 3/20* (2006.01)
*F01N 11/00* (2006.01)
*G01N 29/02* (2006.01)
*B60K 15/03* (2006.01)

(52) U.S. Cl.
CPC .............. *B60K 13/04* (2013.01); *F01N 3/208* (2013.01); *F01N 11/00* (2013.01); *G01N 29/02* (2013.01); *B60K 2015/03427* (2013.01); *F01N 2610/02* (2013.01); *F01N 2610/1406* (2013.01); *F01N 2610/148* (2013.01); *F01N 2610/1473* (2013.01)

(58) Field of Classification Search
CPC .......... B60K 13/04; B60K 2015/03427; F01N 3/208; F01N 11/00; F01N 2610/02; F01N 2610/1473; F01N 2610/1406; F01N 2610/148; F01N 3/2066; G01N 29/02; G01N 33/00; Y02T 10/12; Y02A 50/20; G01F 23/00
See application file for complete search history.

(56) References Cited

U.S. PATENT DOCUMENTS

| 2014/0283933 | A1* | 9/2014 | Andvik | .................... F01N 3/208 137/561 A |
| 2014/0331650 | A1* | 11/2014 | Yang | .................... B01D 53/9495 60/277 |
| 2015/0089996 | A1* | 4/2015 | Reimer | .................... G01N 29/02 73/19.03 |
| 2019/0136807 | A1* | 5/2019 | Leger | .................... F02M 37/0017 |
| 2020/0317044 | A1* | 10/2020 | Paoli | ...................... B60K 15/03 |

FOREIGN PATENT DOCUMENTS

| DE | 102017207923 A1 | 11/2017 |
| EP | 1835136 A1 | 9/2007 |

OTHER PUBLICATIONS

Extended European Search Report, European Application No. 19189623. 2-1004, European Filing Date, Oct. 25, 2019.

* cited by examiner

*Primary Examiner* — Brandon D Lee

(57) ABSTRACT

A sensor head for being arranged in an orifice of a fluid tank includes an opening in fluid communication with a fluid return line returning a fluid to the fluid tank and a bubble reducer device disposed at the opening. The bubble reducer device is configured to block bubbles in the fluid in the fluid return line while the fluid passes through the bubble reducer device during operation.

14 Claims, 6 Drawing Sheets

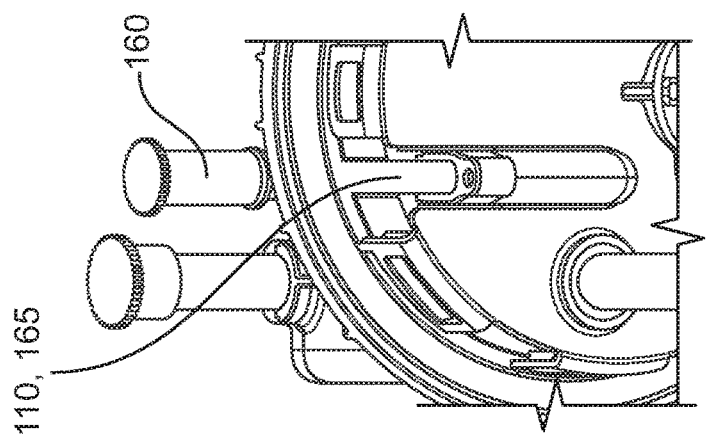
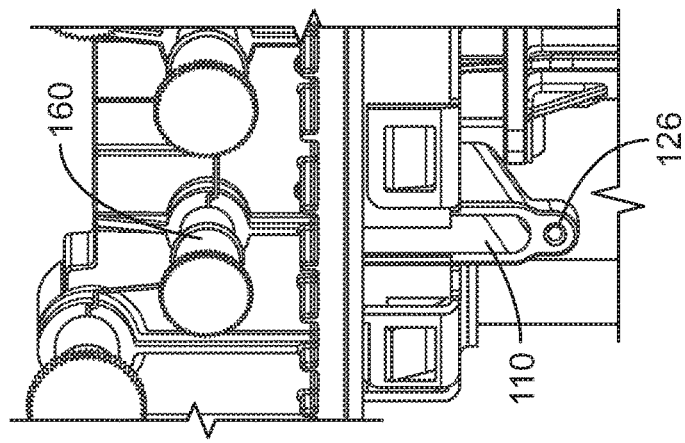
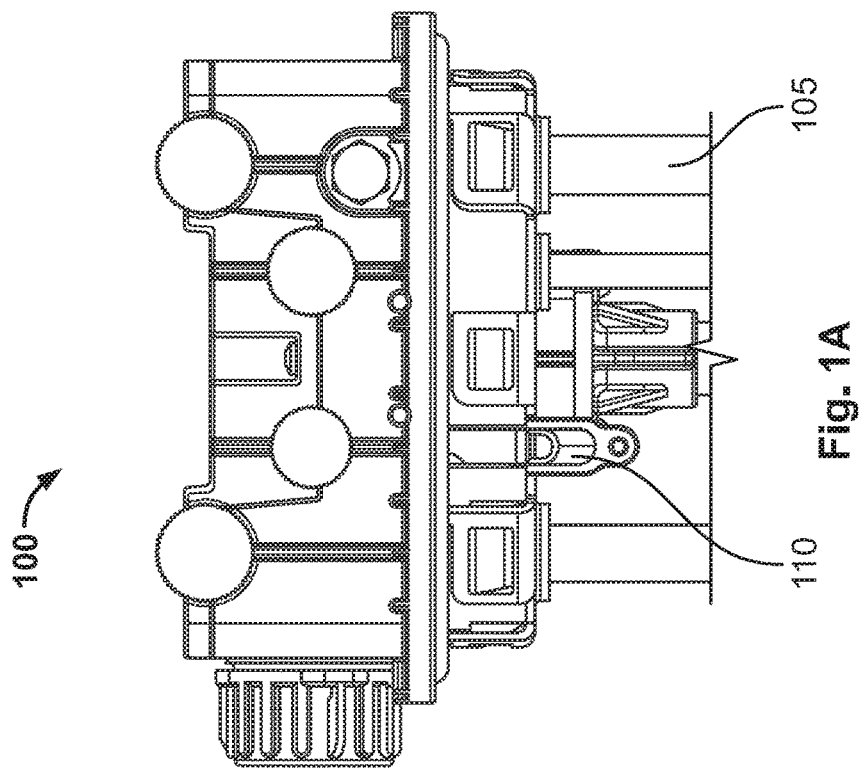

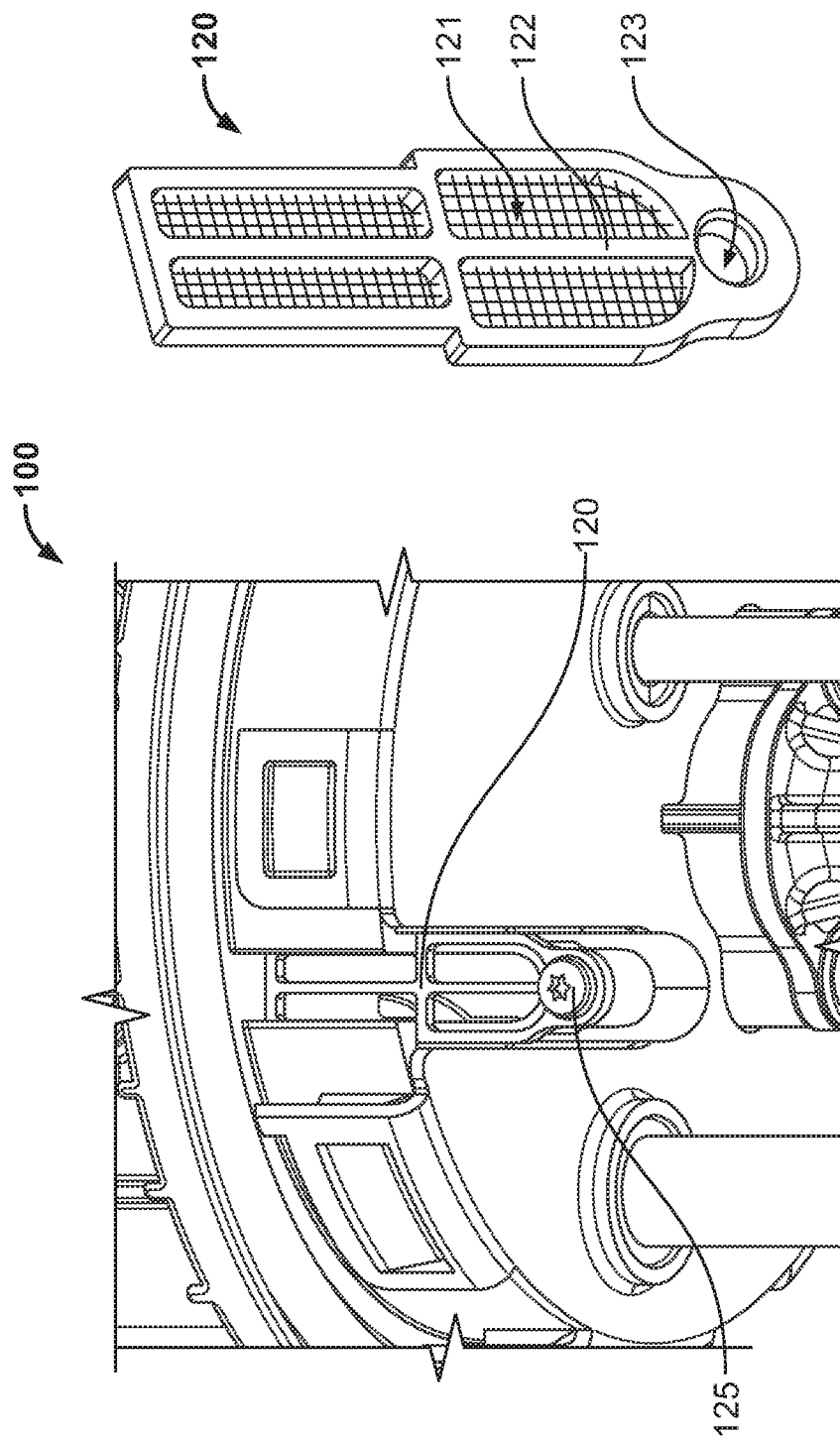

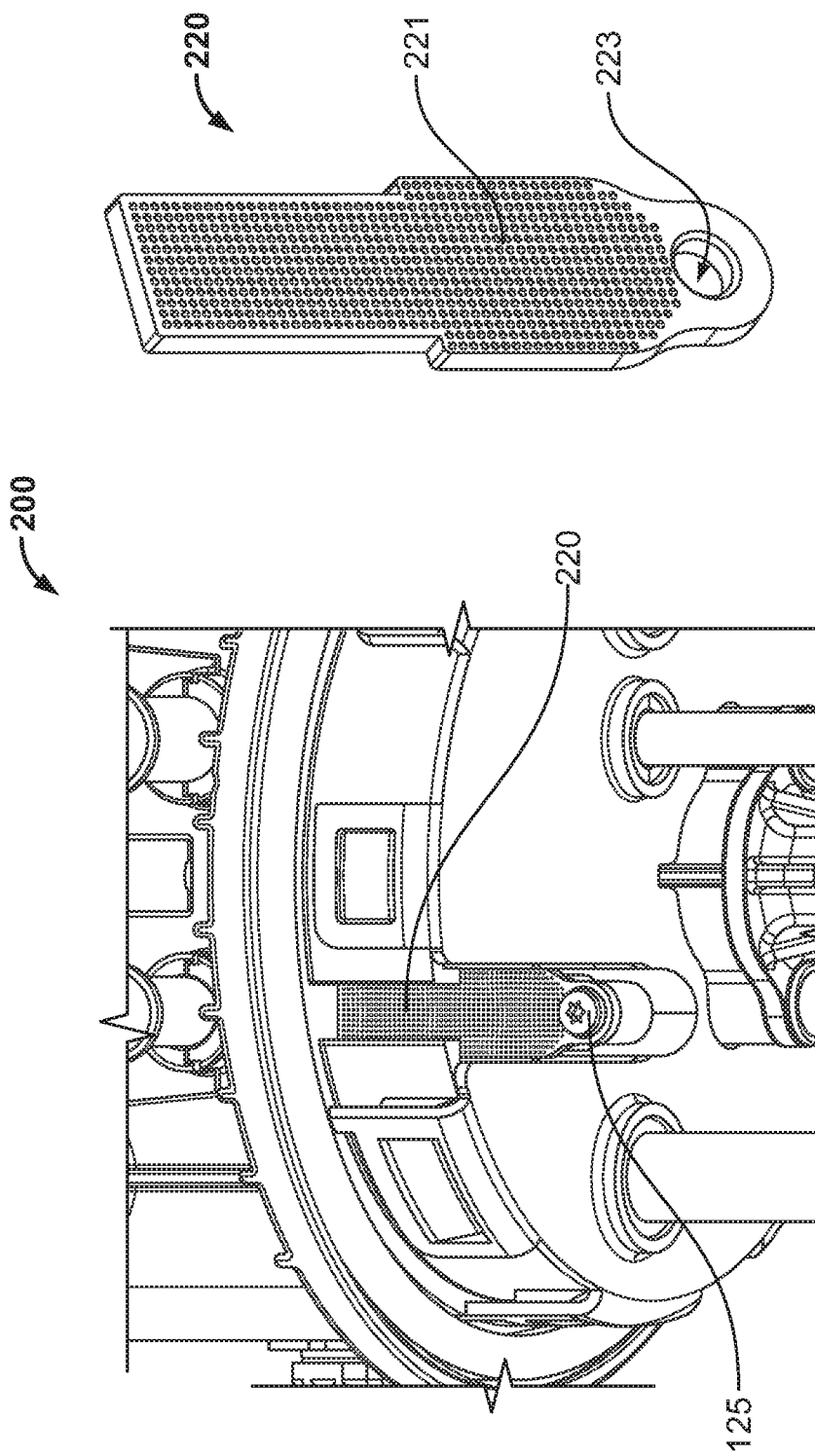

SENSOR HEAD WITH RETURN LINE

CROSS-REFERENCE TO RELATED APPLICATION

This application claims the benefit of the filing date under 35 U.S.C. § 119(a)-(d) of European Patent Application No. 19189623, filed on Aug. 1, 2019.

FIELD OF INVENTION

The present invention relates to a sensor head and, more particularly, to a sensor head arranged in an orifice of a fluid tank.

BACKGROUND

Fluid property sensors are widely used in vehicles. For example, they are used to sense the level of fluids like the fuel level in a fuel tank, or more recently the level and/or quality of urea in a urea tank. This fluid, for example, Diesel Exhaust Fluid (DEF) or Adblue, is employed for reduction systems for reducing harmful NOx components in the exhaust gases of Diesel engines. DEF comprises about 68% demineralized water and 32% urea ($CH_4N_2O$). It is also known as AUS 32 (aqueous urea solution). To achieve an efficient reduction of NOx in exhaust gas, it is important to analyze the quality of the urea solution and their level inside the tank. The quality relates e.g. to at least one of purity and cleanliness of the DEF.

To realize a level measurement for instance, a bank of reed switches provided on a printed circuit board are aligned one beside the other, and are positioned inside a tube, e.g. made of polypropylene. A magnetic float surrounds the tube, and depending on its position on the urea solution, will lead to the switching of a corresponding switch. Besides the level measurement, further properties of the solution can be sensed as well, e.g. the temperature, the concentration or presence of bubbles and the like.

The sensors are often integrated in a tube mounted to a sensor head incorporated in the opening of the tank. The sensor head typically contains openings for further tubes. First, a tube is needed to suck the fluid out of the tank to the place where it reacts with the NOx components. Second, a further tube is required to return fluid that has been sucked out, but not been used for the reduction process back into the tank. Third, as DEF crystallizes/freezes at and below temperatures of −11.5° C., a heating means is needed to heat DEF in case of low ambient temperatures. The heating means usually has a heating coil comprising a single tube. This heating coil is usually connected to the cooling fluid circuit of the vehicle.

An example of a conventional fluid property sensor is described in WO 2011/078692 A1, wherein the quality sensor apparatus for measuring quality of a urea solution is operated with at least a portion of the apparatus inserted into the urea solution. The apparatus includes a configuration of sensors for measuring mechanical and electrical properties within a volume of the urea solution. A data processing arrangement of the apparatus is operable to process the measurements of mechanical and electrical properties for generating output data indicative of a quality of the urea solution. The apparatus is provided with one or more tube connections for adding, removing and/or recirculating urea solution.

Sensors for further properties of the solution comprising a temperature sensor, as well as an ultrasound emitter and sensor for measuring the concentration and quality of urea, are typically located at the lower end of the fluid level sensor at the bottom of the tank.

In many applications, such as in combustion engines, DEF is pumped from the tank to a consumer device, such as the combustion engine. In order to secure a sufficient supply of fluid to the consumer device at all times, more fluid is pumped to the consumer device than is actually needed. Excessive fluid, which is not consumed, is discharged back into the tank.

Often, the tank is provided with a sensor device, which may be used for determining fluid quantity and/or fluid quality. The proper functioning of the sensor device may be impaired by the presence of air bubbles in the stream, in particular bubbles generated by a pump that pumps the fluid. The air bubbles may be introduced by the excessive fluid which is led back to the tank, in combination with high temperature and high pressure. The bubbles may stick e.g. to a fluid quality sensor and can cause measurement errors.

SUMMARY

A sensor head for being arranged in an orifice of a fluid tank includes an opening in fluid communication with a fluid return line returning a fluid to the fluid tank and a bubble reducer device disposed at the opening. The bubble reducer device is configured to block bubbles in the fluid in the fluid return line while the fluid passes through the bubble reducer device during operation.

BRIEF DESCRIPTION OF THE DRAWINGS

The invention will now be described by way of example with reference to the accompanying Figures, of which:

FIG. 1A is a side view of a sensor head according to an embodiment;

FIG. 1B is a side view of the sensor head of FIG. 1A from another angle;

FIG. 1C is a bottom perspective view of the sensor head of FIG. 1A:

FIG. 2 is a perspective view of a detail of the sensor head;

FIG. 3 is a perspective view of bubble reducer device of the sensor head of FIG. 2;

FIG. 4 is a perspective view of a detail of a sensor head according to another embodiment;

FIG. 5 is a perspective view of a bubble reducer device of the sensor head of FIG. 4;

DETAILED DESCRIPTION OF THE EMBODIMENTS

Figure 7:
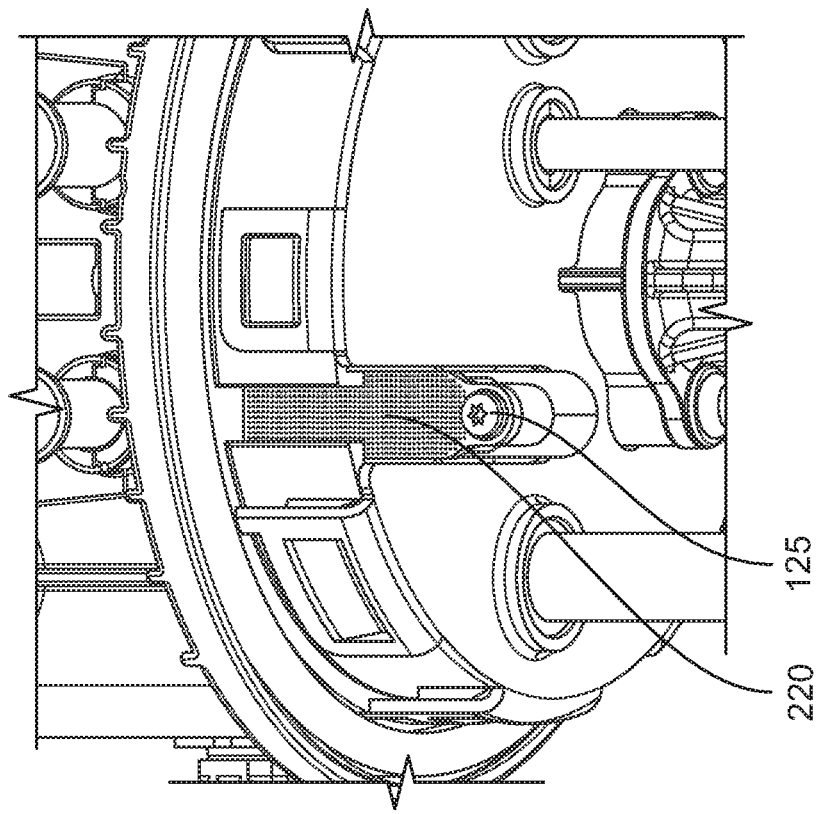
FIG. 7 is a perspective view of the sensor head of FIG. 4 with the bubble reducer device.

In the following, the invention is described in more detail in reference to the attached figures and drawings. Similar or corresponding details in the figures are marked with same reference numerals.

The accompanying drawings are incorporated into the specification and form a part of the specification to illustrate several embodiments of the present invention. These drawings, together with the description, serve to explain the principles of the invention. The drawings are merely for the purpose of illustrating examples of how the invention can be made and used, and are not to be construed as limiting the invention to only the illustrated and described embodiments. Furthermore, several aspects of the embodiments may form—individually or in different combinations—solutions according to the present invention. The following described embodiments can thus be considered either alone or in an arbitrary combination thereof. The described embodiments are merely possible configurations, and it must be borne in mind that the individual features described herein can be provided independently of one another, or can be omitted altogether while implementing this invention. Further features and advantages of the invention will become apparent from the following, more particular description of the various embodiments of the invention.

FIGS. 1A, 1B, and 1C show a sensor head 100 of a fluid sensor according to an embodiment, here a urea sensor. The urea sensor is part of a selective catalytic reduction (SCR) system, and can be mounted at an orifice in the wall of a urea tank (302 in FIG. 10). This corresponds to a standardized sensor head design showing the DEF return as an integrated part of the sensor header, where the bubble reducer device will be mounted. The sensor head 100 can attached to the urea tank and a sensor unit of the urea sensor is arranged spaced apart from the sensor head 100 and extends into the tank. The sensor unit comprises a module for measuring fluid properties like temperature, urea concentration and fluid quality.

The sensor head 100, as shown in FIGS. 1B and 1C, includes a return line 160 that leads to a return cavity 165 which is integrated in the sensor head 100. The return line 160 feeds back unused urea solution into the tank via the return cavity 165 and through an opening 110. The return cavity 165 or duct may be terminating at the opening 110. The return cavity 165 may shorten the fluid return line 160. The opening 110 may be arranged on a peripheral surface of the sensor head 100. This is considered to be advantageous regrading a reduction of the space that is required for the lines and openings at the sensor head 100.

A suction line 110, shown in FIGS. 1A-1C, allows retrieving the urea solution out of the tank. The suction line 110 for sucking fluid out of the tank is connected to the sensor head 100. The return cavity 165 may be configured in the form of a duct arranged in the sensor head. The sensor head comprises a screw hole 126 for attaching a bubble reducer device (see below) to the opening 110 to cover the return cavity 165. The return line 160 and return cavity 165 provide an initial reduction of the amount of bubbles before the fluid reaches the bubble reducer device.

FIG. 2 shows part of the sensor head 100 with the bubble reducer device 120 removably attached to it by a screw 125 that is screwed into the screw hole 126. The bubble reducer device 120 is configured to block bubbles in the fluid in the return line 160 while the fluid passes through the bubble reducer device 120 during operation of the urea sensor. This has the effect of eliminating or at least reducing the collection of air bubbles in the tank and at a fluid quality sensor unit, for example, and thereby the functioning of the sensor in the tank is not impaired. In this embodiment, the bubble reducer device 120 is configured as comprising a mesh 121, shown in FIG. 3, through which the urea solution passes to return to the tank.

The bubble reducer device 120 is shown in more detail in FIG. 3. The mesh 121 is attached to a support structure 122 and is thereby stabilized. The mesh 121 has a plurality of holes and may be formed from a resin, for example, or alternatively from steel or a cloth. In the case of steel, a net may be attached to a support structure and similarly in case of a cloth. The screw 125 passes through an attachment hole 123 of the bubble reducer device 120. If the mesh 121 or net is flexible, it may be attached to a rigid structure with openings larger that the openings in the mesh 121 or net. The bubble reducer device 120 has a flat shape.

A size of each of the holes or openings in the mesh 121 may be in a range of 0.01 to 5.0 mm, 0.15 to 0.5 mm, or 0.015 to 0.1 mm or 0.1 to 0.5 mm. The holes may have a circular, rectangular or quadratic shape. The size corresponds to the diameter for circular holes, and to the length of a diagonal in case of a rectangular or quadratic shape. This has been determined to be particularly suitable for reducing air bubbles in DEF. The bubble reducer device 120 may be manufactured with different sizes of the holes and can thus be used on the same sensor head 100 for different applications.

The bubble reducer device 120 blocks bubbles in the fluid from entering into DEF tank to some extent. The device 120 shown is a separate add-on to an existing sensor head 100. Therefore, it is easily configurable based on customer needs. The bubble reducer device 120 can be offered as a standardized additional add-on part.

A sensor head 200 according to another embodiment is shown in FIG. 4, in which the bubble reducer device 220 is formed differently than in the embodiment described with respect to FIGS. 2 and 3, while the sensor head 200 is otherwise similar to the sensor head 100 as shown in FIGS. 1A-1C.

The bubble reducer device 220 of FIG. 4 is shown in more detail in FIG. 5. The bubble reducer device 220 is here formed from a single piece of resin (for example by injection molding) with a grid of through holes 221 formed therein. It also includes an attachment hole 223 for attachment to the sensor head 200 by the screw 125. The bubble reducer device 220 has a flat shape and a uniform thickness.

Figure 6:
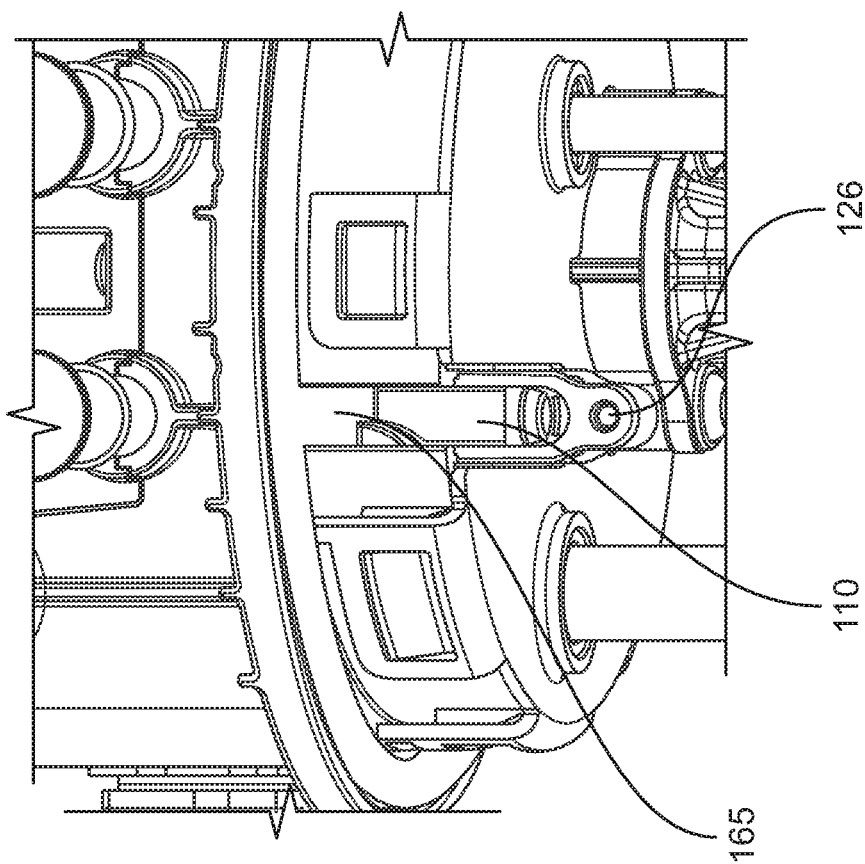
FIG. 6 is a perspective view of the sensor head of FIG. 4 without the bubble reducer device.

FIGS. 6 and 7 show the sensor head 200 according to the embodiment of FIGS. 4 and 5 without and with the bubble reducer device 220, respectively.

Figure 9B:
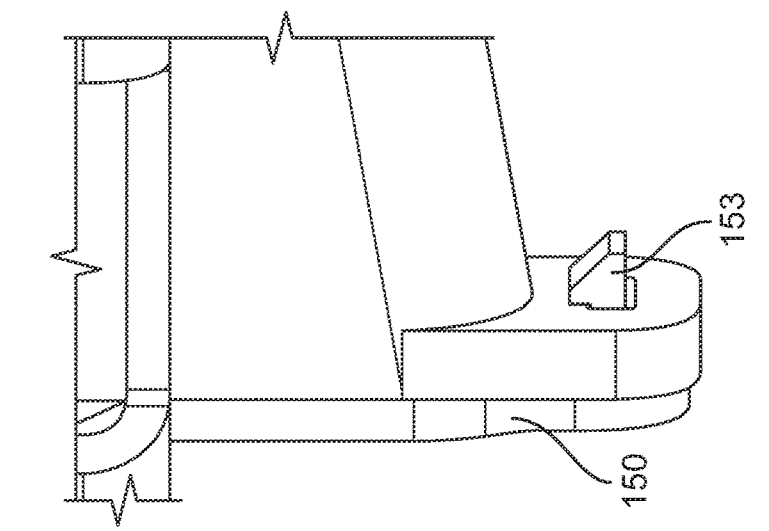
FIG. 9B is a perspective view of a nose of the bubble reducer device of FIG. 9A.
Figure 9A:
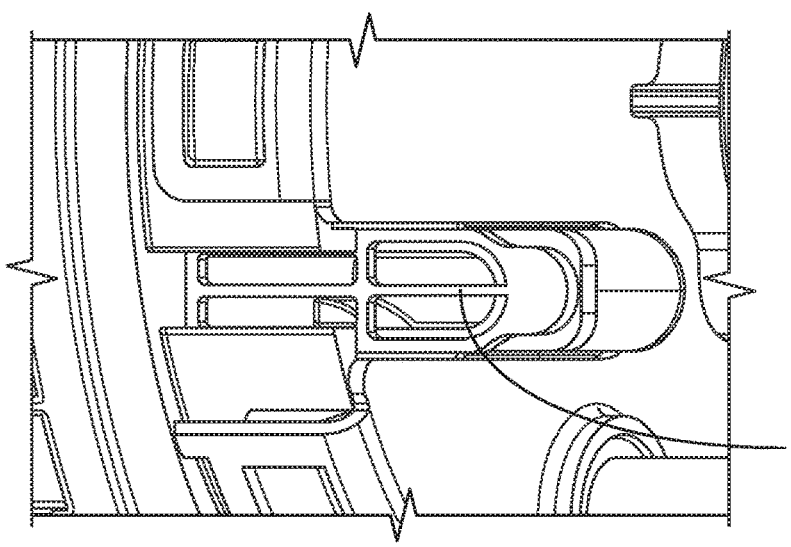
FIG. 9A is a perspective view of the sensor head of FIG. 2 with the bubble reducer device attached by a snap fit.
Figure 8:
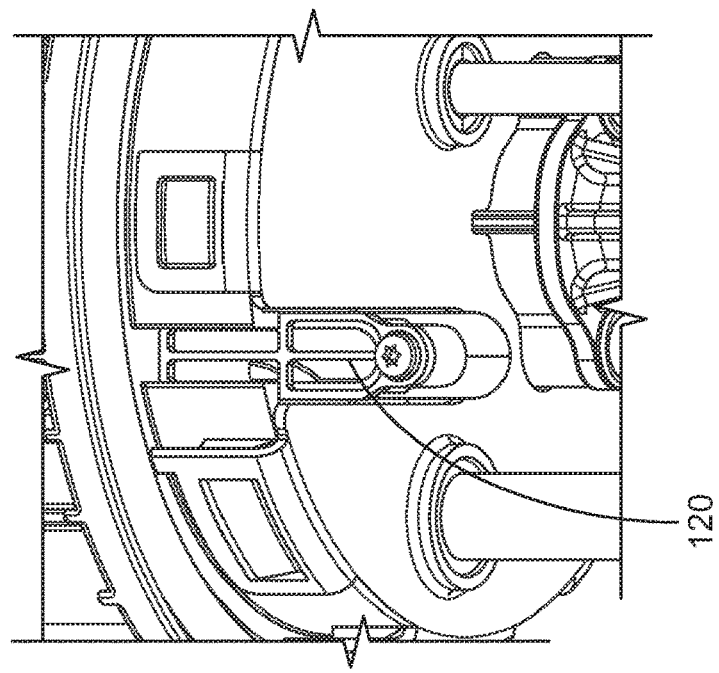
FIG. 8 is a perspective view of a sensor head of FIG. 2 with the bubble reducer device attached by a screw.

FIGS. 8, 9A, and 9B show different types of attachment of the bubble reducer device 120, 150 to the sensor head 100, 200. In FIG. 8, the attachment is by a screw as discussed above, while in FIGS. 9A and 9B the removable attachment is by a snap-in mechanism. As shown in the embodiment of FIGS. 9A and 9B, a bubble reducer device 150 has a nose 153 that is inserted into a corresponding snap-in opening in a protruding portion of the sensor head 100. Accordingly, the bubble reducer device 150 can be assembled on the head 100 with different fixation types as shown in FIGS. 8, 9A, and 9B. With focus of cost efficiency, a snap fit design fixation can be considered. The bubble reducer device 150 can be easily and conveniently replaced.

Figure 10:
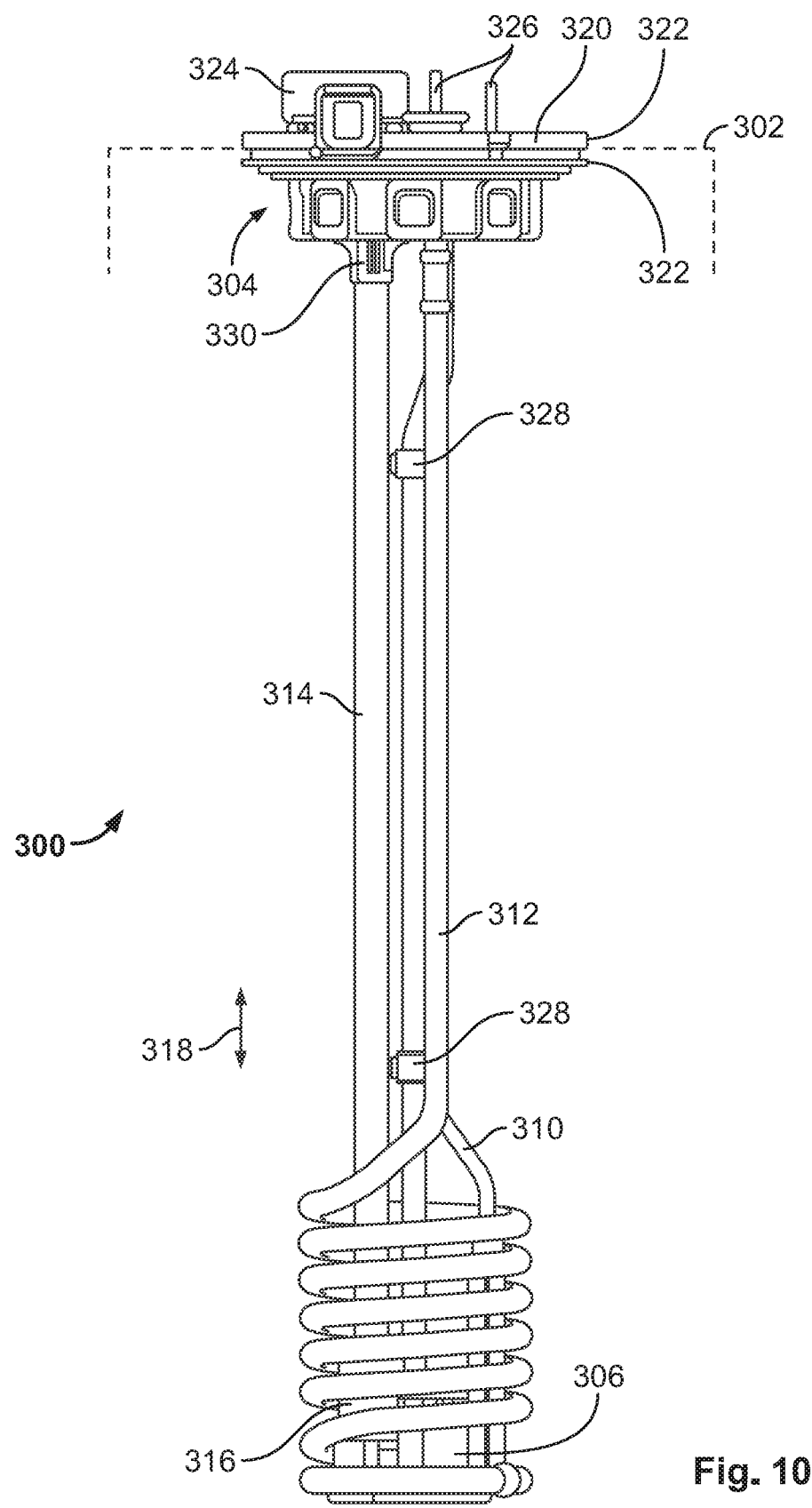
FIG. 10 is a perspective view of a fluid sensor according to an embodiment.

FIG. 10 shows a perspective view of a urea sensor 300 according to the present invention. The urea sensor 300 is part of an SCR system for purification of NOx components in the exhaust gases of diesel vehicles and can be mounted at an orifice in the wall of a urea tank 302. The urea sensor 300 comprises a sensor head 304 which is attached to the urea tank 302 and a sensor unit 306 which is arranged distanced apart from the sensor head 304 and extends into the tank 302. The sensor head 304 may be formed according to one of the embodiments explained above with reference to FIGS. 1-9B.

A sensor unit 306, shown in FIG. 10, has a module for measuring fluid properties like temperature and urea concentration and fluid quality. A return cavity with an opening is formed in the sensor head 304 and through a bubble reducer device covering the opening, unused urea solution is fed back into the tank 302. A suction tube 310 allows retrieving urea solution out of the tank 302. Furthermore, a heating coil 312 is provided for heating the urea solution in the vicinity of the sensor unit 306 and a suction tube 310 in order to avoid freezing of or thaw already frozen urea solution. The suction tube 310 for sucking fluid out of the tank 302 is fixed to the heating coil 312 via a plurality of clamps 328, in order to warrant that the fluid which is sucked out has the right temperature for operation. Of course, the clamps 328 may also be fabricated from a plastic material.

A support tube 314, shown in FIG. 10, accommodates a series of reed relays and allows a float 316 to slide along a direction 318. The float 316 has a magnetic element, so that the reed relays are actuated by the movement of the float 316 along the support tube 314, thereby providing a signal indicative of the level of the urea solution in the tank 302.

The sensor head 304, as shown in FIG. 10, has a base 320 which is fabricated from an electrically insulating material. The base 320 is mounted at the urea tank 302 by a plurality of bulges 322 on a peripheral rim of the base 320, the bulges 322 fitting to corresponding notches in the opening of the tank 302, ensuring the correct azimuthal orientation of the sensor head 304 once it resides in the opening of the tank 302.

As shown in FIG. 10, on top of the base 320, a cover 324 is provided for protecting a power line, a grounding line, and a CAN bus. An electrical connector which is attached to the wiring system of the vehicle, for instance a truck, can be connected to the cover 324. Next to the cover 324, a plurality of protective plugs 326 for the protection of the tube openings against dirt can be seen. These protective plugs 326 are removed before the tubing from the vehicle is attached. The support tube 314 is mechanically stabilized and fixed to the base 320 by a float stop 330.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Spatially relative terms, such as "proximal", "distal", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations), and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art, and will not be interpreted in an idealized or overly formal sense unless expressly so defined herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects.

While the present disclosure has been particularly shown and described with reference to exemplary embodiments thereof, it will be understood by those skilled in the art that various changes in form and details may be made therein without departing from intent of the disclosure as defined by the appended claims. The exemplary embodiments should be considered in descriptive sense only, and not for purposes of limitation. Therefore, the scope of the present disclosure is defined not by the above description of the invention, but by the appended claims, and all differences within the scope will be construed as being included in the present invention.

What is claimed is:

1. A sensor head for being arranged in an orifice of a fluid tank for a reducing agent, comprising:
    an opening in fluid communication with a fluid return line returning a fluid to the fluid tank, the opening is arranged on a peripheral surface of the sensor head; and a bubble reducer device disposed at the opening and removably attached to the sensor head, the bubble reducer device configured to block bubbles in the fluid in the fluid return line while the fluid passes through the bubble reducer device during operation, the bubble reducer device has a flat shape.

2. The sensor head of claim 1, wherein the bubble reducer device has a plurality of through holes formed in a mesh, a net, or a grid.

3. The sensor head of claim 2, wherein the bubble reducer device has a uniform thickness.

4. The sensor head of claim 2, wherein a size of each hole of the plurality of through holes is in a range of 0.01 to 5.0 mm.

5. The sensor head of claim 2, wherein each of the through holes has a circular, a rectangular, or a quadratic shape.

6. The sensor head of claim 1, wherein the bubble reducer device is a resin, a steel, or a cloth material.

7. The sensor head of claim 1, wherein the bubble reducer device is removably attached to the sensor head with a screw.

8. The sensor head of claim 1, wherein the bubble reducer device is removably attached to the sensor head with a nose on the bubble reducer device fixed in a snap-in opening of the sensor head.

9. The sensor head of claim 1, further comprising a return cavity integrated in the sensor head and in fluid communication with the opening.

10. The sensor head of claim 9, wherein the return cavity terminates at the opening.

11. A fluid sensor, comprising:
a sensor head arranged in an orifice of a fluid tank for a reducing agent, the sensor head including an opening in fluid communication with a fluid return line returning a fluid to the fluid tank and a bubble reducer device disposed at the opening and removably attached to the sensor head, the opening is arranged on a peripheral surface of the sensor head, the bubble reducer device configured to block bubbles in the fluid in the fluid return line while the fluid passes through the bubble reducer device during operation, the bubble reducer device has a flat shape; and
a sensor unit arranged in the fluid tank and distanced from the sensor head.

12. The fluid sensor of claim 11, wherein the sensor unit measures a fluid quality of the fluid.

13. The fluid sensor of claim 11, further comprising a float providing a signal indicative of a level of the fluid in the fluid tank.

14. A selective catalytic reduction system for purification of components in exhaust gases of diesel vehicles, comprising:
a urea solution tank; and
a fluid sensor installed in the urea solution tank and measuring a property of a urea solution in the urea solution tank, the fluid sensor including a sensor head arranged in an orifice of the urea solution tank and a sensor unit arranged in the urea solution tank and distanced from the sensor head, the sensor head including an opening in fluid communication with a fluid return line returning the urea solution to the urea solution tank and a bubble reducer device disposed at the opening and removably attached to the sensor head, the opening is arranged on a peripheral surface of the sensor head, the bubble reducer device configured to block bubbles in the urea solution in the fluid return line while the urea solution passes through the bubble reducer device during operation, the bubble reducer device has a flat shape.

* * * * *